July 26, 1938.
H. S. McCRAY
2,125,245
EMULSION APPARATUS
Filed June 28, 1935
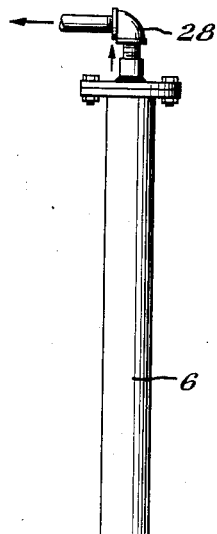
FIG.1.
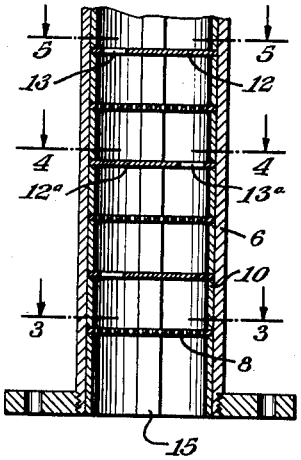
FIG.2.
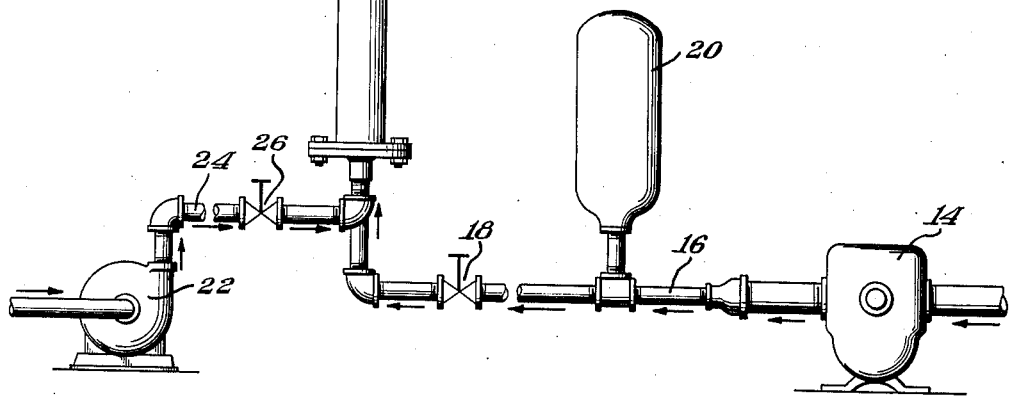
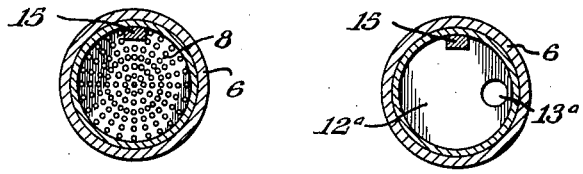
FIG.3.   FIG.4.
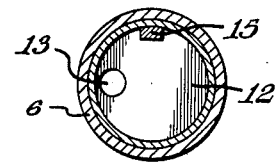
FIG.5.
H.S. McCray
INVENTOR
BY P. J. Dearborn
his ATTORNEY Patented July 26, 1938

2,125,245

UNITED STATES PATENT OFFICE 2,125,245

EMULSION APPARATUS

Howard S. McCray, Port Neches, Tex., assignor to The Texas Company, New York, N. Y., a corporation of Delaware Application June 28, 1935, Serial No. 28,979

1 Claim. (Cl. 259—4)

This invention relates to an improvement in dispersing apparatus for dispersing one immiscible liquid into another, for example, the apparatus is applicable to the production of dispersions of asphalt, paraffin, and other thermoplastic hydrocarbons in water.

It is a primary feature of the invention to provide an apparatus of this character which will embody in the dispersing apparatus no moving parts and which will form dispersions of relatively small particle size and of high degree of uniformity and stability without excessive power consumption.

The invention will be more fully understood from the following description when considered in connection with the drawing, wherein,—

Fig. 1 is an elevational view of one form of apparatus embodying my invention.

Fig. 2 is a vertical sectional view of a portion of the dispersing tube and chamber.

Figs. 3, 4 and 5 are horizontal sectional views taken on the lines 3—3, 4—4 and 5—5 of Fig. 2.

In carrying out the present invention there is provided a dispersing chamber shown as a tube 6 mounted in a vertical position and having an internal diameter of from 2 to 8 inches and an overall length of from 2 to 10 feet, the tube shown in the present embodiment having an internal diameter of 4 inches and an overall length of approximately 5 feet. The tube is provided internally with a number of transverse dispersing plates 8 each formed with a plurality of small openings through which the maerials to be dispersed are passed. The openings in the plates 8 are of minute size, for example, being between $\frac{1}{16}$ and $\frac{1}{8}$ of an inch in diameter. It is preferred to have the openings in the lower half of the tube somewhat larger than those in the upper portion, for example, the openings may be $\frac{3}{32}$ inch in diameter in the lower half of the tube and $\frac{1}{16}$ of an inch in diameter in the upper half of the tube although, obviously, these exact dimensions are not essential. The plates extend entirely across the tube 6 and, as shown, may be mounted by being placed between spacing tubes 10, the construction requiring the passage of the dispersing material through the openings in the plates 8 as the material passes upwardly through the tube.

A succession of baffle plates 12 and 12a are positioned between dispersing plates 8, the plates being formed with restricted passages 13 and 13a, respectively, through which the materials being dispersed are passed. Successive openings 13 and 13a are preferably positioned on opposite sides of the dispersing chamber to cause more thorough mixing, the plates 8, 12 and 12a being held in their set positions by engagement with the key 15 secured to the interior wall of tube 6. The purpose of the passages 13 and 13a is to cause an accumulation of the material being dispersed at points between successive dispersing plates so that when the dispersed materials are finally discharged from the dispersing chamber they will be entirely uniform in character. The passages 13 and 13a may occupy approximately $\frac{1}{10}$ of the cross sectional area of the tube, the passages being sufficiently large that they form little obstruction to the passage of the materials through the tube and likewise they have little dispersing action on the materials passing through the same.

The apparatus can be used for dispersing any usual type of material, such, for example, as heat liquefied asphalt, paraffin, or like hydrocarbon material. It is customary to supply a dispersing agent either with the melt or in the water solution or both. The present invention contemplates the use of any preferred dispersing or stabilizing agent.

The materials to be dispersed and the water or other liquid provided to constitute the continuous phase of the dispersion are preferably introduced into the lower portion of the chamber under substantial pressure, for example, from 5 to 50 pounds per square inch gauge. To this end there is provided a pump 14 for receiving heat liquefied asphalt or other material from a suitable source of supply, not shown, the pump forcing the material through the conduit 16 into the lower end of the dispersing tube 6. The supply of material and also the pressure under which the same is supplied can be controlled either through control of the speed of the pump 14 or by means of the control valve 18 or both. In order to produce a uniform flow of materials through the dispersing chamber a surge drum 20 is preferably mounted between the pump 14 and the dispersing chamber 6, the drum 20 absorbing temporary variations in pressure in the material passing into the dispersing chamber.

The water, carrying dissolved stabilizing material or alkali for reaction with the stabilizing material, in case the latter is introduced with the melt, is supplied by means of the pump 22. This pump receives the water or caustic solution from a suitable source of supply, not shown, and forces the same under pressure through the tubing 24 into the lower end of the dispersing tube 6 adjacent the discharge end of the tubing 16. The flow of the water solution can likewise be regulated by varying the speed of the pump 22 or by valve 26 or both.

The finished emulsion is discharged from the upper portion of the dispersing chamber by means of a suitable overflow device, shown as tubing 28 which may have a suitable flow restricting device similar to valve 18.

In operation it has been found that by introducing the materials into the dispersing chamber 6 under substantial pressure of from 5 to 50 pounds gauge, the apparatus has a very high capacity, without undue power consumption. The restricted openings in the dispersing plates 8 break up the bituminous or other material into fine particles, tending to the formation of stable dispersions. By accumulating the stream of material first adjacent one side of the tube and then the other, accomplished by staggering the passages 13 and 13a, the discharged product is substantially uniform during normal operation of the apparatus. A gauge pressure of approximately 40 pounds per square inch adjacent the pump 14 has been found to be the most satisfactory.

Obviously, many modifications and variations of the invention, as hereinbefore set forth, may be made without departing from the spirit and scope thereof, and therefore only such limitations should be imposed as are indicated in the appended claim.

I claim:

In an apparatus for dispersing thermoplastic hydrocarbon materials in water, a dispersing chamber, a series of spaced foraminous dispersing plates mounted in fixed relation to said chamber and extending across the same, and intermediate fixed baffle plates between said dispersing plates and each having a cut-out portion near its outer edge through which said hydrocarbon materials and water pass as they are moved from one disersing plate to another.

HOWARD S. McCRAY.